Figure 1:
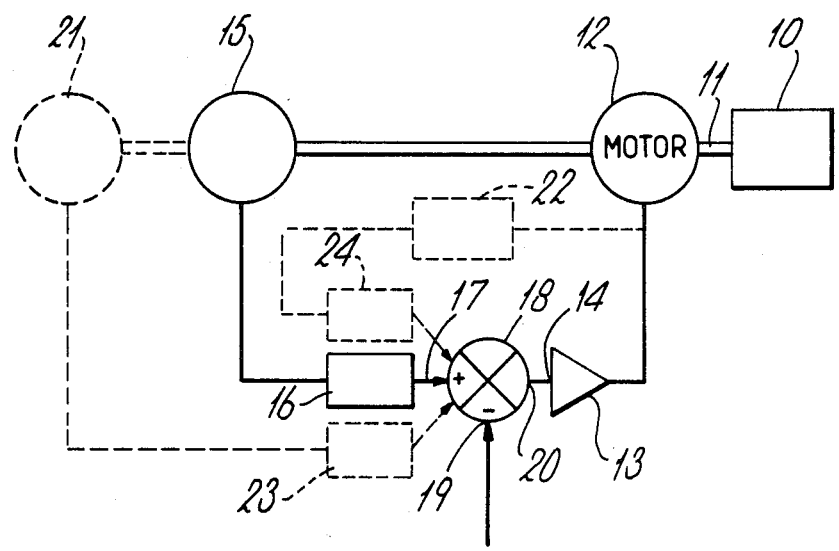

United States Patent [19]

McKeand

[11] Patent Number: 4,642,542
[45] Date of Patent: Feb. 10, 1987

[54] VELOCITY CONTROL SYSTEMS

[75] Inventor: Alexander W. McKeand, Edinburgh, Scotland

[73] Assignee: Ferranti plc, Cheshire, England

[21] Appl. No.: 796,242

[22] Filed: Nov. 8, 1985

[30] Foreign Application Priority Data

Nov. 9, 1984 [GB] United Kingdom ............... 8428418

[51] Int. Cl.⁴ .......................................... G05B 21/02
[52] U.S. Cl. .................................. 318/636; 318/561; 318/571
[58] Field of Search ............... 318/636, 561, 571, 341

[56] References Cited

U.S. PATENT DOCUMENTS 4,153,863 5/1979 Schachle et al. ................. 318/341

FOREIGN PATENT DOCUMENTS 0097435 1/1984 European Pat. Off. .
1449175 9/1976 United Kingdom .
1590370 6/1981 United Kingdom .

Primary Examiner—William M. Shoop, Jr.
Assistant Examiner—Saul M. Bergmann
Attorney, Agent, or Firm—Kerkam, Stowell, Kondracki & Clarke

[57] ABSTRACT

A motor 12 (FIG. 2) is controlled to move at a demanded velocity, input at 29, by sampling the position of the motor at sample intervals, digitally determining the demanded change in position per sample interval, modifying each position sample by the addition of said demanded change, comparing the modified position value with the previous modified sample to derive a position error signal representing the position error between the instantaneous position and that demanded by motion at the demanded velocity, and applying the position error signals from successive sample intervals to motor drive means.

6 Claims, 2 Drawing Figures

VELOCITY CONTROL SYSTEMS

This invention relates to velocity control systems and in particular to the control of motor velocity.

It is known to control motor velocity to a high degree of accuracy by means of a closed loop velocity feedback servo technique in which a tachometer or tachogenerator produces feedback signals which have a value proportional to the instantaneous velocity of the motor. The feedback signals are compared with signals of the same format representing a demanded velocity in error measuring means and the difference, representing the velocity error, applied to a source of motor drive current to vary that current in accordance with the magnitude of velocity error.

It is found in practice that when very low velocities are involved the feedback signals produced by conventional tachogenerators or other velocity measuring transducers are often not sufficiently accurate and/or stable to meet the demanded motion requirements.

Such an effect may be mitigated by the introduction of a gearing system whereby the tachogenerator (and possibly the motor) is driven at a higher velocity than a member being moved so that it functions in a more suitable range of velocities. However it will be appreciated that most forms of gearing exhibit undesirable features affecting accuracy, particularly where direction reversals are involved, and where the motor or driven member has to function over a wide range of velocities, the increase of tachogenerator velocity at low speeds may prove disadvantageous at, or in limiting, higher speeds.

It is an object of the present invention to provide a motor velocity control feedback servo operable over a lower extending range whilst mitigating the above outlined disadvantages.

According to one aspect of the present invention a motor velocity control arrangement comprises a motor coupled to a driven member, motor drive means arranged to supply current to the motor at a level related to the value of an error signal applied thereto, transducer means operable to produce signals representative of the instantaneous position of the driven member or motor and digital processing means including input means operable to receive the value of a demanded velocity, sampling means operable to sample the transducer signals to determine the instantaneous position of the driven member at predetermined sampling intervals, displacement means responsive to the value of demanded velocity and sampling rate to determine the demanded change in body position in the sampling interval, said digital processing means being operable to compare the magnitudes of successive adjacent instantaneous position samples, one of which is modified by the demanded change in body position, to derive from the comparison a positional error signal representing the position error between the instantaneous position and that demanded by motion at said demanded velocity and to apply said error signal to the motor drive means.

According to another aspect of the present invention a method of controlling the velocity of a motor powered by drive means and coupled to drive a driven member, comprises sampling the instantaneous position of the driven member or motor at predetermined sampling intervals, determining from a demanded velocity value and value of a positional displacement of the driven member or motor associated with each sampling interval, comparing values of samples from successive intervals, one of the sample values being modified by the value of said positional displacement, to derive a representation of the positional error between the instantaneous position and that demanded by motion at said demanded velocity, and applying signals representing said positional error to the drive means.

Figure 2:
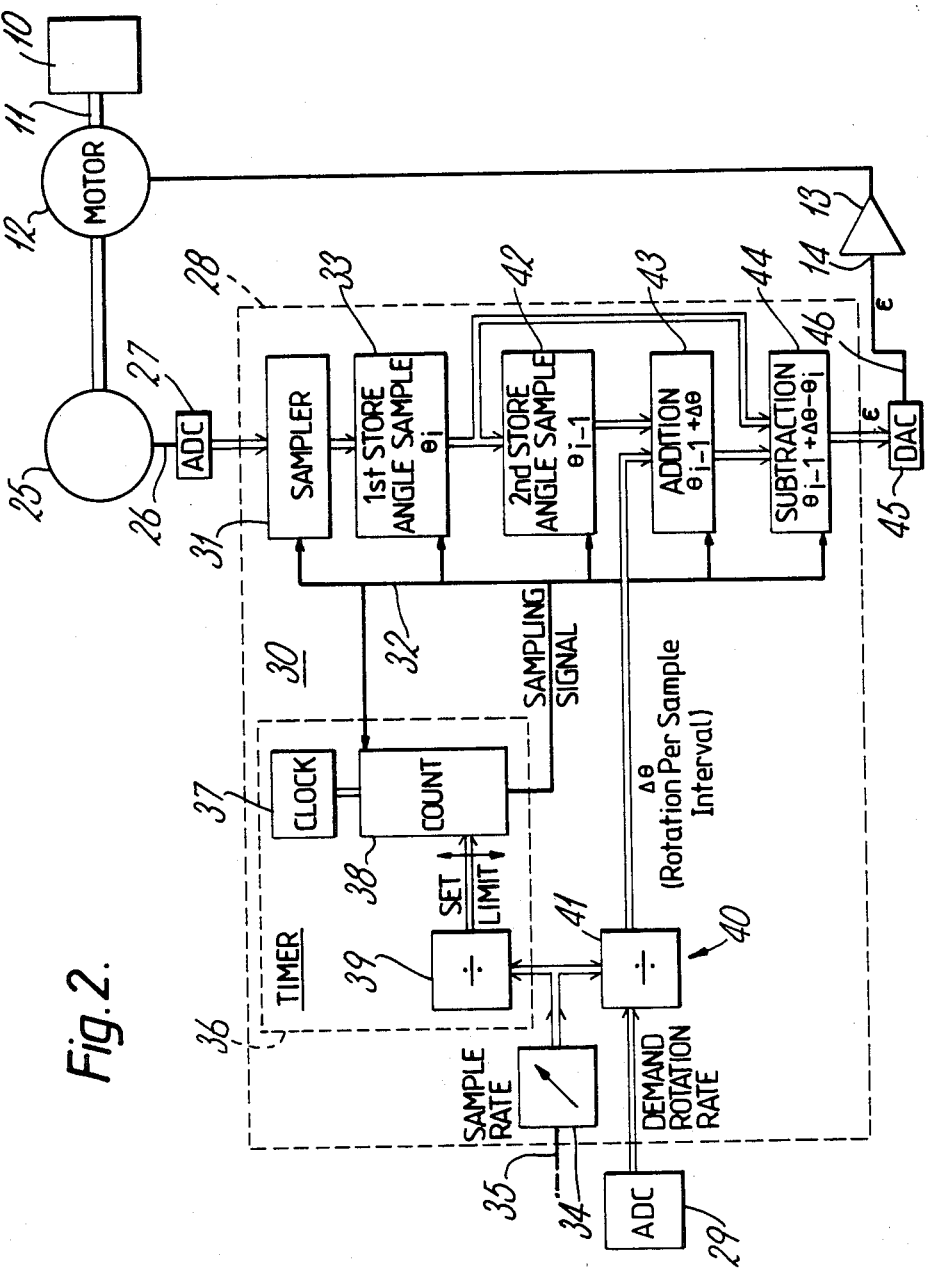

An embodiment of the invention will now be described by way of example with reference to the accompanying drawings, in which:

FIG. 1 is a schematic electro-mechanical circuit diagram of a known motor velocity control arrangement having a velocity feedback servo configuration, and FIG. 2 is a schematic electro-mechanical circuit diagram of a motor velocity control arrangement according to the present invention.

Referring to FIG. 1 a body 10 comprises a driven member mounted for rotation on a shaft 11 of a motor 12. The motor is a d.c. servo motor provided with current by motor drive means 13, comprising a power amplifier, the magnitude of the drive current being proportional to the magnitude of an error signal applied to amplifier input 14.

The motor shaft 11 also drives a shaft velocity transducer 15 such as a tachogenerator.

The velocity related signals produced by the tachogenerator are applied to a feedback network 16 having a transfer function as is well known in the art for modifying the signals as to phase etc. before applying them to one input 17 of error measuring means 18. The error measuring means comprises a differencing circuit having a second input 19 to which a velocity demand signal is applied and an output 20 from which a velocity error signal, whose magnitude represents the difference between the measured instantaneous and demanded angular velocities of the motor, is produced for application to the drive amplifier 13.

This form of velocity feedback servo is well known and it will be appreciated that transducers 21 and 22 may be provided which measure the instantaneous motor shaft angular position and the motor acceleration respectively, the transducer 22 being either of an electromechanical type coupled to the shaft 11 or possibly an electronic type responsive to the drive current applied to the motor. Such transducers 21 and 22 are coupled by way of feedback networks 23, 24 respectively to other inputs of the error measuring means 18 to modify the servo response.

It will be appreciated that any one or even two of the transducers may be omitted with the corresponding feedback signals being synthesised by integration or differentiation of the measured transducer signals as appropriate.

Referring now to FIG. 2 a similar velocity servo arrangement is shown, and corresponding reference numerals used, in which a driven member 10 is coupled to shaft 11 of motor 12.

Drive means 13 in the form of a power amplifier provides drive current to the motor having a magnitude proportional to that of an error signal applied to amplifier input 14.

A shaft angular position transducer 25 is coupled to the shaft and provides a feedback signal on line 26 related to the instantaneous angular position of the shaft 11. The signals on line 26 are coupled by way of an analog-to-digital converter (ADC) 27 to digital processing means 28.

The digital processing means comprises input means 29 in the form of an ADC to which an analog signal representing the demanded velocity, that is motor angular rotation rate, is applied.

Sampling means 30 comprises a sampling device 31 responsive to a sampling signal on line 32 to sample the instantaneous value of the shaft angle signal provided by transducer 25 and apply it to a first storage means 33 as described hereinafter.

The sampling signal defines a succession of sampling intervals and forms a time base on which signal processing occurs.

A sample rate generator 34, which may be preset or respond to input signals on line 35, generates a representation of sample rate by which the sampling interval is defined. The sampling means 30 also comprises timing means 36 including a clock 37 arranged to produce a train of pulses at a relatively high and accurately maintained repetition rate, the pulses being applied to an input of counter 38. Division means 39 receives the representation of sample rate from generator 34 and a representation of the clock frequency, and the quotient of clock frequency divided by sample rate is used as a counting limit to which the counter 38 is set. The counter counts clock pulses and after the set number have been counted, a sampling signal is produced on line 32 and the counter reset to begin counting for the next sampling interval.

The timing means 36 thus provides a succession of sampling signals at accurately timed intervals inversely proportional to the preset sample rate to define the sampling intervals.

Displacement means 40 comprises division means to which is applied the value of demanded rotation rate from input means 29 and sample rate from generator 34, the quotient produced at 41 representing the (demanded) motor shaft rotation per sample interval at the demanded rotation rate ($\Delta\theta$).

The first storage means 33 is responsive to each sample signal to shift out the value of angle sample stored therein to accept a succeeding one, the value being shifted to second storage means 42.

The second storage means 42 is similar to that of 33 in that it responds to the sampling signal to shift out the stored value of angle sample whilst receiving the stored value of the succeeding sample shifted out of storage means 33.

Thus in any sample interval i the first storage means holds an angle sample value $\theta_i$ and the second storage means holds an angle sample value $\theta_{i-1}$.

The sample value ($\theta_{i-1}$) in the second storage means 42 is applied to addition means 43 in which the sample value is modified by incrementing it by the representation ($\Delta\theta$) from the displacement means. This modified sample value ($\theta_{i-1}+\Delta\theta$) represents the value that should comprise the ith interval sample and is applied to subtraction means 44 with the actual sample value ($\theta_i$) from the first storage means, the resultant value ($\theta_{i-1}+\Delta\theta-\theta_i$) representing an error $\epsilon$ due to rotation at other than the demanded rate.

The error $\epsilon$ is of course in digital form and is converted to analog form by digital-to-analog converter (DAC) 45 for application on line 46 to the input 14 of the motor drive means 13.

The sampling signal in addition to triggering the sample taking device 31 and causing shifting of samples through storage means 33 and 42 also serves to reset the addition and subtraction means 43, 44 so that an error signal evaluation is made for successive samples in each sample interval.

It will be appreciated that the angular position transducer may take a form in which the displacement is detected in incremental steps and produced as an output directly in digital form suitable for digital processing.

Furthermore it will be appreciated that the arrangement is inherently suited to operation at low demanded rotation rates. If the resolution of the angular position transducer 25 is sufficiently high then smooth rotation may be expected but if the resolution is low or rotational velocity very low the motion may comprise a series of discrete steps, the step discontinuity being integrated out to some extent by the drive motor or inertia of the body.

The digital processing means is shown as a collection of interconnected functional blocks and serves to illustrate either components and signal paths in a hardware circuit structure or flow paths of information progressing through a series of program steps in a computer structure and detailed methods of implementing the digital processing means in either of these forms are well known and require no further description.

Of the forms possible for the digital processing means the use of a computer and software implementation may be prefered as the computer may be programmed to configure the servo differently, say to a position servo or an acceleration servo or any combination thereof by stored relationship alone or as modified by other unspecified inputs.

The above description has related to a motor which undertakes rotational motion about shaft 11. It will be understood that the above described arrangement is equally applicable to control of linear velocity of a linear motor.

I claim:

1. A motor velocity control arrangement comprising a motor coupled to a driven member, motor drive means arranged to supply current to the motor at a level related to the value of an error signal applied thereto, transducer means operable to produce signals representative of the instantaneous position of the driven member or motor and digital processing means including input means operable to receive the value of the demanded velocity, sampling means operable to sample the transducer signals to determine the instantaneous position of the driven member at predetermined sampling intervals, displacement means responsive to the value of demanded velocity and sampling rate to determine the demanded change in body position in the sampling interval, said digital processing means being operable to compare the magnitudes of successive adjacent instantaneous position samples, one of which is modified by the demanded change in body position, to derive from the comparison a positional error signal representing the position error between the instantaneous position and that demanded by motion at said demanded velocity and to apply said error signal to the motor drive means.

2. A motor velocity control arrangement as claimed in claim 1 in which the sampling means includes timing means having a clock operable to produce a train of pulses at an accurately maintained repetition rate, and counting means operable to count clock pulses to a count limit defined by a function of the sampling rate to provide a sampling signal defining each sampling interval.

3. A motor velocity control arrangement as claimed in claim 2 in which the timing means includes division means operable to determine the quotient of the clock pulse repetition rate and the desired sampling rate, said quotient comprising the function of sampling rate defining the sampling interval.

4. A motor velocity control arrangement as claimed in claim 2 in which the displacement means comprises division means operable to produce the quotient of the value of the demanded velocity and the desired sampling rate.

5. A motor velocity control arrangement as claimed in claim 1 in which the digital processing means includes first storage means operable in each sampling interval to receive and store a sample of the instantaneous position of the driven member from the sampling means, and to shift out a previously stored sample, second storage means operable in each sampling interval to receive the stored sample shifted out of the first storage means and to shift out a previously stored sample, addition means operable to add to the value of the sample stored in the second storage means the value of demanded change determined by the displacement means, and subtraction means operable to determine the difference in value between the value produced by the addition means and that of the sample stored in the first storage means.

6. A method of controlling the velocity of a motor powered by drive means and coupled to drive a driven member, comprising sampling the instantaneous position of the driven member or motor at predetermined sampling intervals, determining from a demanded velocity value the value of a positional displacement of the driven member or motor associated with each sampling interval, comparing values of samples from successive intervals, one of the sample values being modified by the value of said positional displacement, to derive a representation of the positional error between the instantaneous position and that demanded by motion at said demanded velocity, and applying signals representing said positional error to the drive means.

* * * * *